(12) United States Patent
Lanoue et al.

(10) Patent No.: US 6,221,297 B1
(45) Date of Patent: Apr. 24, 2001

(54) METHOD OF MANUFACTURING A TRANSFORMER COIL WITH A DISPOSABLE WRAP AND BAND MOLD AND INTEGRATED WINDING MANDREL

(75) Inventors: Thomas J. Lanoue, Cary, NC (US); Wayne Lambert, Bland; Charles Sarver, Rocky Gap, both of VA (US)

(73) Assignee: ABB Power T&D Company Inc., Raleigh, NC (US)

( * ) Notice: Subject to any disclaimer, the term of this patent is extended or adjusted under 35 U.S.C. 154(b) by 0 days.

(21) Appl. No.: 09/405,017

(22) Filed: Sep. 27, 1999

(51) Int. Cl.⁷ .................................................... B29C 70/70
(52) U.S. Cl. ........................ 264/219; 264/272.19; 29/605
(58) Field of Search .................. 29/605, 606; 264/219, 264/272.15, 272.19, 272.2, 130; 336/96

(56) References Cited

U.S. PATENT DOCUMENTS

| | | | | |
|---|---|---|---|---|
| 3,041,562 | * | 6/1962 | Gammel, Sr. ................... | 264/272.19 |
| 3,248,468 | | 4/1966 | Anderson ......................... | 264/272.19 |
| 3,577,506 | * | 5/1971 | Brown .............................. | 264/272.19 |
| 4,337,219 | | 6/1982 | Falkowski et al. .................. | 264/130 |
| 4,540,536 | | 9/1985 | Altmann et al. ...................... | 264/102 |
| 5,036,580 | | 8/1991 | Fox et al. .............................. | 29/605 |
| 5,056,214 | * | 10/1991 | Holt .................................... | 29/602.1 |
| 5,197,180 | | 3/1993 | Mihalko ................................. | 29/596 |
| 5,317,300 | * | 5/1994 | Boesel ..................................... | 336/96 |
| 5,331,730 | * | 7/1994 | Brinn, Jr. .............................. | 29/606 |
| 5,481,191 | | 1/1996 | Rzedzian .............................. | 324/318 |
| 5,633,019 | | 5/1997 | Clark et al. .......................... | 425/116 |

* cited by examiner

*Primary Examiner*—Angela Ortiz
(74) *Attorney, Agent, or Firm*—Woodcock Washburn Kurtz Mackiewicz & Norris

(57) ABSTRACT

A method of manufacturing transformer windings embedded in casting resin is disclosed which utilizes an integrated winding mandrel for producing a non-standard oval shaped epoxy encapsulated low voltage coil for dry type distribution transformers. The method includes a process of winding a low voltage oval coil over a disposable mold which acts as both a winding mandrel and as an inner mold shell for epoxy encapsulation. Both the inner and outer molds are made of low cost sheet metal utilizing a "wrap and band" process The complete winding and molding processes can all be conducted on a standard winding machine.

6 Claims, 5 Drawing Sheets

METHOD OF MANUFACTURING A TRANSFORMER COIL WITH A DISPOSABLE WRAP AND BAND MOLD AND INTEGRATED WINDING MANDREL

RELATED APPLICATION

A related application is Ser. No. 09/405,587, filed Sep. 27, 1999, entitled "Method of Manufacturing a Transformer Coil With a Disposable Mandrel and Mold" filed concurrently herewith by Thomas J. Lanoue, Wayne Lambert and Charles Sarver and assigned to the same assignee as the present application, the disclosure of which is incorporated herein by this reference thereto.

BACKGROUND OF THE INVENTION

1. Field of the Invention

The invention relates to a method of manufacturing transformer windings embedded in casting resin and more particularly to a method of manufacturing a transformer coil encapsulated in casting resin wherein the disposable mold acts both as a winding mandrel and as an inner mold shell for resin encapsulation. The invention is particularly suited to the manufacture of low voltage non-standard oval shaped or circular shaped epoxy encapsulated coils for dry type distribution transformers.

2. Description of the Prior Art

Currently the state of the art is precision made standard sized re-usable round shaped mandrels and molds in fixed size increments. Examples of prior art methods of encapsulating transformer coils are disclosed in U.S. Pat. Nos. 4,337,219, 4,540,536, 5,036,580 and 5,633,019.

SUMMARY OF THE INVENTION

It is an object of the invention to provide a method of manufacturing a low voltage transformer coil utilizing a molding process with an integrated winding mandrel for producing a non-standard oval or circular shaped epoxy encapsulated low voltage coil for dry type distribution transformers. The process includes winding a circular or oval coil over a disposable mold which acts as both a winding mandrel and as an inner mold shell for epoxy encapsulation. It is an object of the invention to make the inner and outer molds of low cost sheet metal. The invention process has many advantages over conventional fixed size standard winding mandrels and casting molds. Among the features and advantages of the present invention are the use of low cost sheet metal in a "wrap and band" process to form a flexible sized oval or round mandrel and mold. The complete winding and molding processes can all be conducted on a standard winding machine. The invention process provides the advantages of flexible oval or round dimensional sizes, flexible and incremental oval or round shapes providing substantially reduced mandrel and molding costs, elimination of costly standard mold storage, elimination of the need for standard winding mandrels, controlled epoxy thickness for increased dielectric strength and reliability, improved manufacturer ability, reduction in epoxy cost, and facilitates the opportunity to manufacture transformer coils in a round to oval configuration.

In accordance with the foregoing objects and advantages, the present invention provides a method of manufacturing a transformer coil encapsulated in a casting resin utilizing a disposable casting mold comprising the steps of forming an annular mandrel by applying to a mandrel shaft, a plurality of annular shaped support plates spaced on the shaft. The method further includes the step of forming a disposable inner mold by wrapping sheet metal over the annular shaped support plates during the winding set up process to produce an integrated winding form/mandrel/inner mold for use in the winding process and placing the integrated winding form/mandrel/inner mold in a winding machine. The method further includes the step of winding a coil around the inner mold while in the winding machine and forming an outer mold by wrapping a plurality of sheet metal layers over the finished coil and mechanically attaching the layers to the finished coil with glass adhesive tape to hold the sheet metal in its starting position. The method further includes the step of spirally wrapping non-adhesive glass tape over the outer mold to secure it in position and completing the outer mold by banding the outer mold with banding strip in a plurality of spaced positions and removing the manufactured coil and mold assembly from the winding machine. The method further includes the steps of up righting of the coil and mold assembly and attaching a base thereto, providing a seal between the base and the coil and mold assembly to prevent epoxy leaks during the encapsulation process, and filling the mold with epoxy to encapsulate the coil with casting resin.

In accordance with a further aspect of the invention the disposable inner mold is formed by three overlapping layers of sheet metal attached to the inner mold support plates so that the sheet metal can be tightly wrapped around the inner mold support plates thereby eliminating and metal slippage during the wrapping process, securing the wrapped sheet metal in place with non-adhesive tape temporarily, wrapping plastic tape over the entire length of the wrapped inner mold to provide sealing of the wrapped inner mold for the subsequent epoxy encapsulation process, and applying a mold release agent over the plastic tape to eliminate epoxy adhesion thereby simplifying the mold removal process thus completing the integrated form/mandrel/inner mold so that it is ready for the winding process.

For a more detailed disclosure of the invention and for further objects and advantages thereof, reference is to be had to the following description taken in conjunction with the accompanying drawings.

DESCRIPTION OF THE PREFERRED EMBODIMENT

The present invention is particularly suited for manufacturing oval or round shaped epoxy encapsulated low voltage coils for dry type distribution transformers. The embodiment to be described herein describes a manufacturing process for a disposable oval mold for a low voltage coil. The present invention embodies a molding concept utilizing thin gauge steel sheet both for winding mandrel and as mold shells on the inside and outside of a low voltage coil. The process is simple and low cost, thus providing a method that has no standard size limitations. The present invention is suitable for round or oval winding configurations. As hereinafter described, the present invention utilizes the inner mold as an integral part of the coil winding process.

Figure 1:
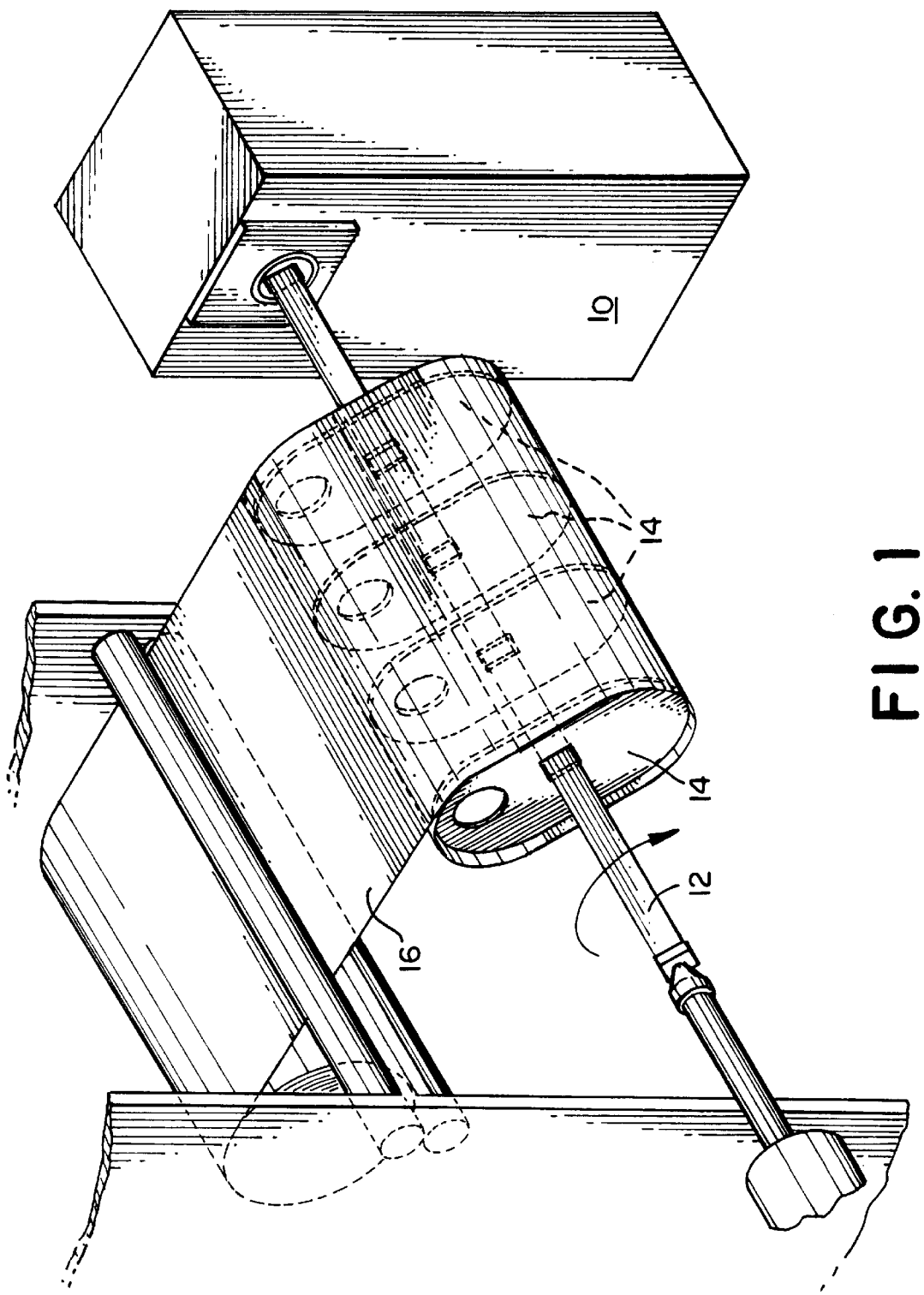
FIG. 1 is a perspective view illustrating the winding of sheet metal onto a mandrel to produce an integrated winding form/mandrel/inner mold, for use in manufacturing a transformer coil encapsulated in casting resin utilizing a disposable casting mold in accordance with the method of the present invention.

Referring to FIG. 1 there is illustrated a coil winding machine 10 having a conventional square mandrel shaft 12. In order to produce a coil or winding having an oval configuration an elliptical or oval shaped fixture is applied to the mandrel 12. This oval sheet metal fixture is the device that forms the oval configuration for the winding. As may be seen in FIG. 1 there are four oval shaped fixtures or inner support plates 14, preferably fabricated from 11 gauge steel, and equally spaced on the conventional square mandrel shaft 12. In practice, the bottom plate 14 preferably is mounted 2" from the bottom end of the mold when the finished coil and mold assembly are in there fully assembled vertical position shown in FIG. 5. Thus the bottom plate provide mechanical support during the resin casting process and prevents the inner mold from flexing inward due to the head pressure of the resin; thus causing a leak. The inner support plates 14 are used to establish the size and shape of the inner area of the coil to be wound thereon. To maintain the support plates 14 in spaced position, suitable spacer tubes, not shown, are mounted therebetween on the mandrel 12. Various lengths of spacer tubes may be used to accommodate various coil axial lengths. Lead support plates, not shown, normally are provided for holding the start lead in position during the winding process. The lead support plates are positioned near the ends of the mandrel 12 and keep the lead from sliding around the mold due to the tension of the winding machine. The disposable mold preferably is made with standard steel 0.015" thick material, which can be easily formed and recycled. This material is utilized in both the inner and outer mold shells in the present "wrap and band" process. The 0.015" steel material 16, is wrapped over the inner support plates 14 during the winding set up process. The integration or wrapping of the steel sheet material 16 on the inner support plates 14 forms the mandrel base for the coil winding process and subsequently becomes the inner mold 20, FIG. 2, for the encapsulation process. Thus this integrated process facilitates the additional feature of "winding on the mold". The light gauge steel material 16 is applied continuously with three overlapping layers, which is mechanically attached to the inner mold support plates 14 by a slot, not shown, in the support plates. This locks the steel sheet 16 in the position so that the sheet can be tightly wrapped around the inner support plates 14; thus eliminating any material slippage during the wrapping process. The wrapped steel sheet 16 is held or secured in place with non-adhesive glass tape temporarily. A plastic tape, for example Mylar tape, is applied over the entire length of the wrapped inner mold 20. The Mylar tape provides sealing of the wrapped mold 20 for the subsequent epoxy encapsulation process. A mold release agent is applied over the Mylar tape to eliminate epoxy adhesion thus simplifying the mold removal process.

Figure 3:
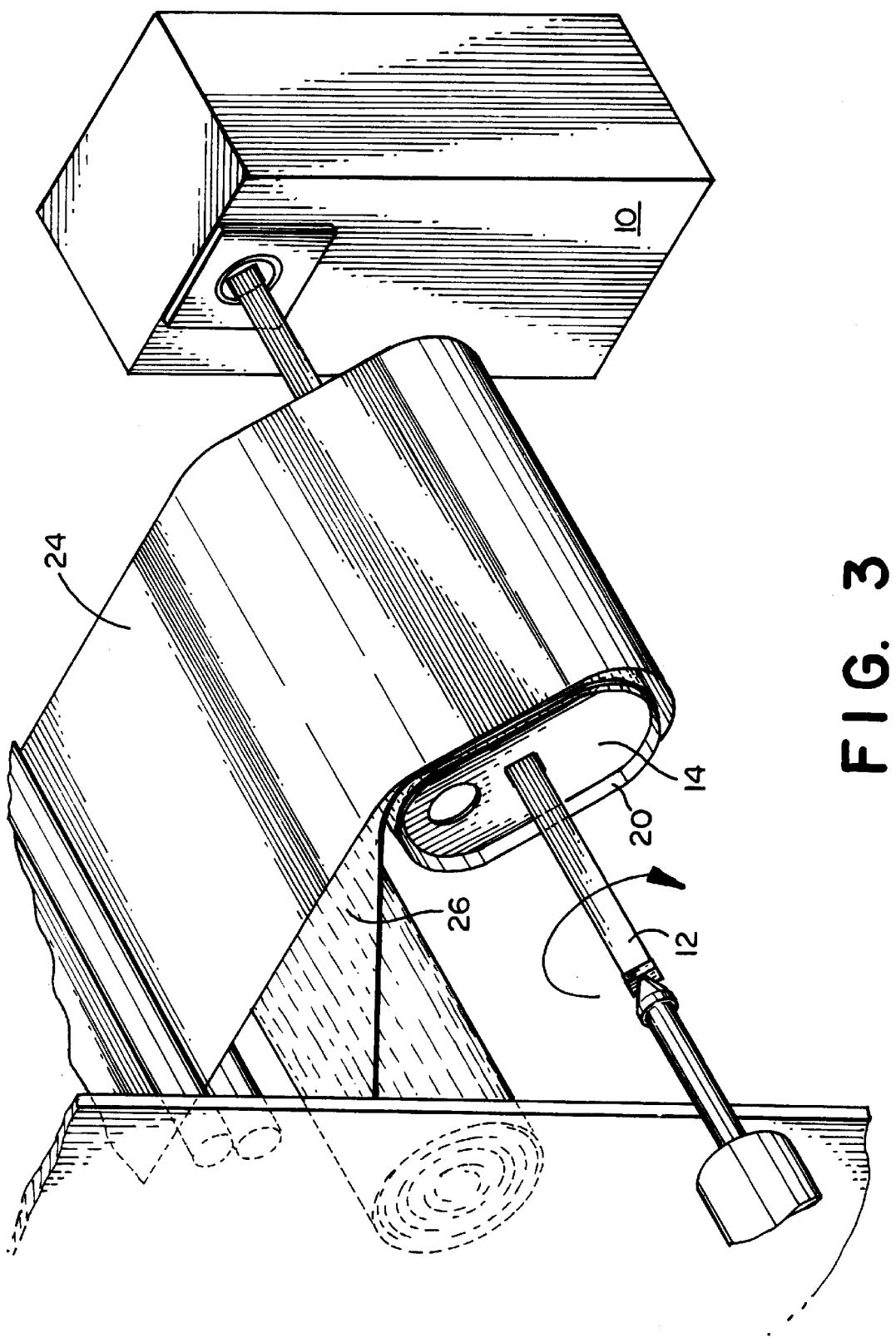
FIG. 3 is a perspective view illustrating the step of winding insulating tape and conductor onto the inner mold to produce the coil of the transformer.
Figure 4:
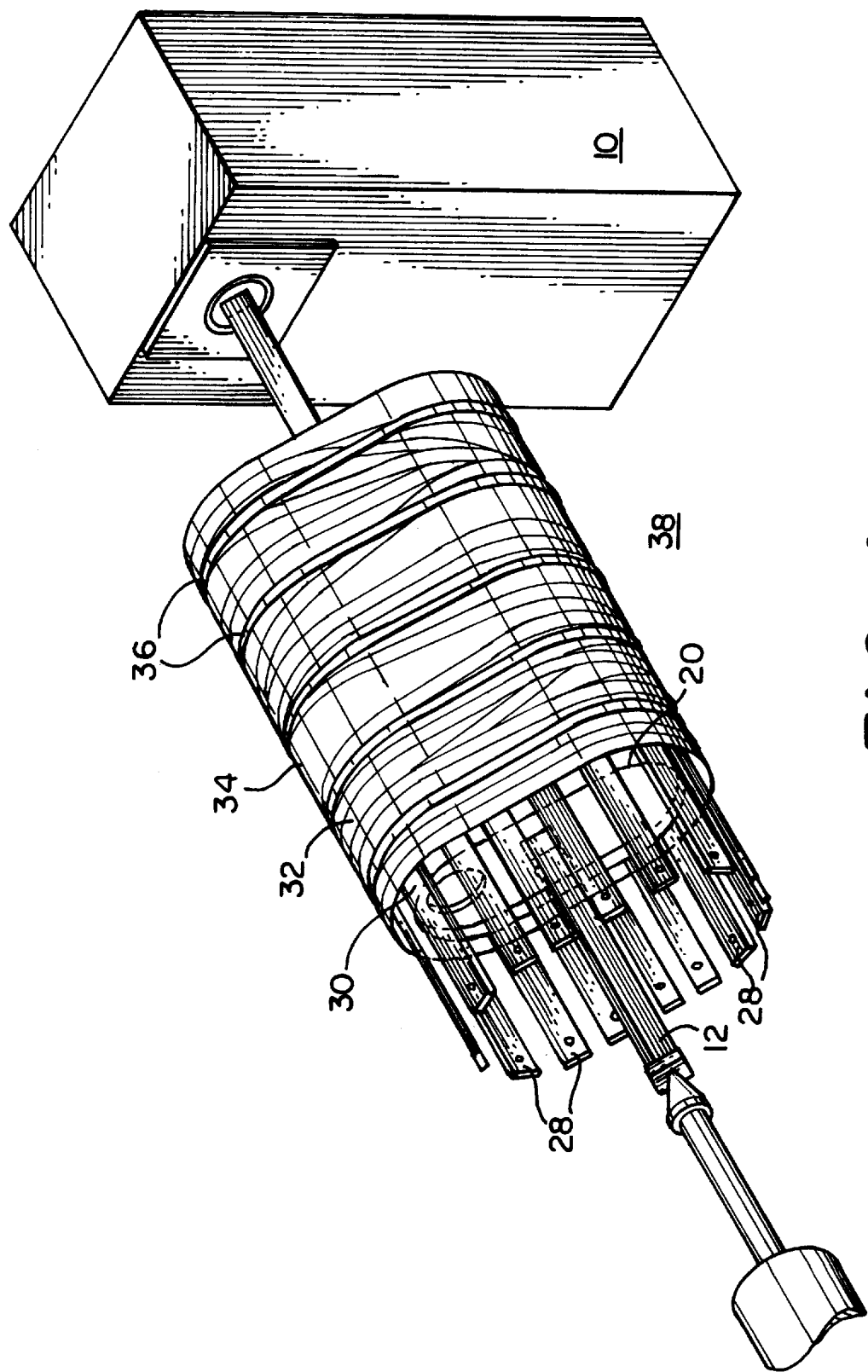
FIG. 4 is a perspective view showing the coil, wound on the inner mold and an outer mold applied over the coil with cooling duct bars inserted between layers of the coil to produce a manufactured coil and mold assembly.

After the inner mold 20 has been completed, it is ready to have the coil wound thereon. The inner mold 20 is first wrapped with glass grid insulation 22, FIG. 2, then a conventional coil is wound thereon. As may be seen in FIG. 3, the coil is wound from alternate layers of copper conductor 24 and insulating tape 26 on the conventional winding machine 10. During the winding, cooling duct bars are inserted between every other layer of conductor to provide cooling ducts in the completed transformer. The cooling duct bars 28 are illustrated in FIG. 4.

Figure 2:
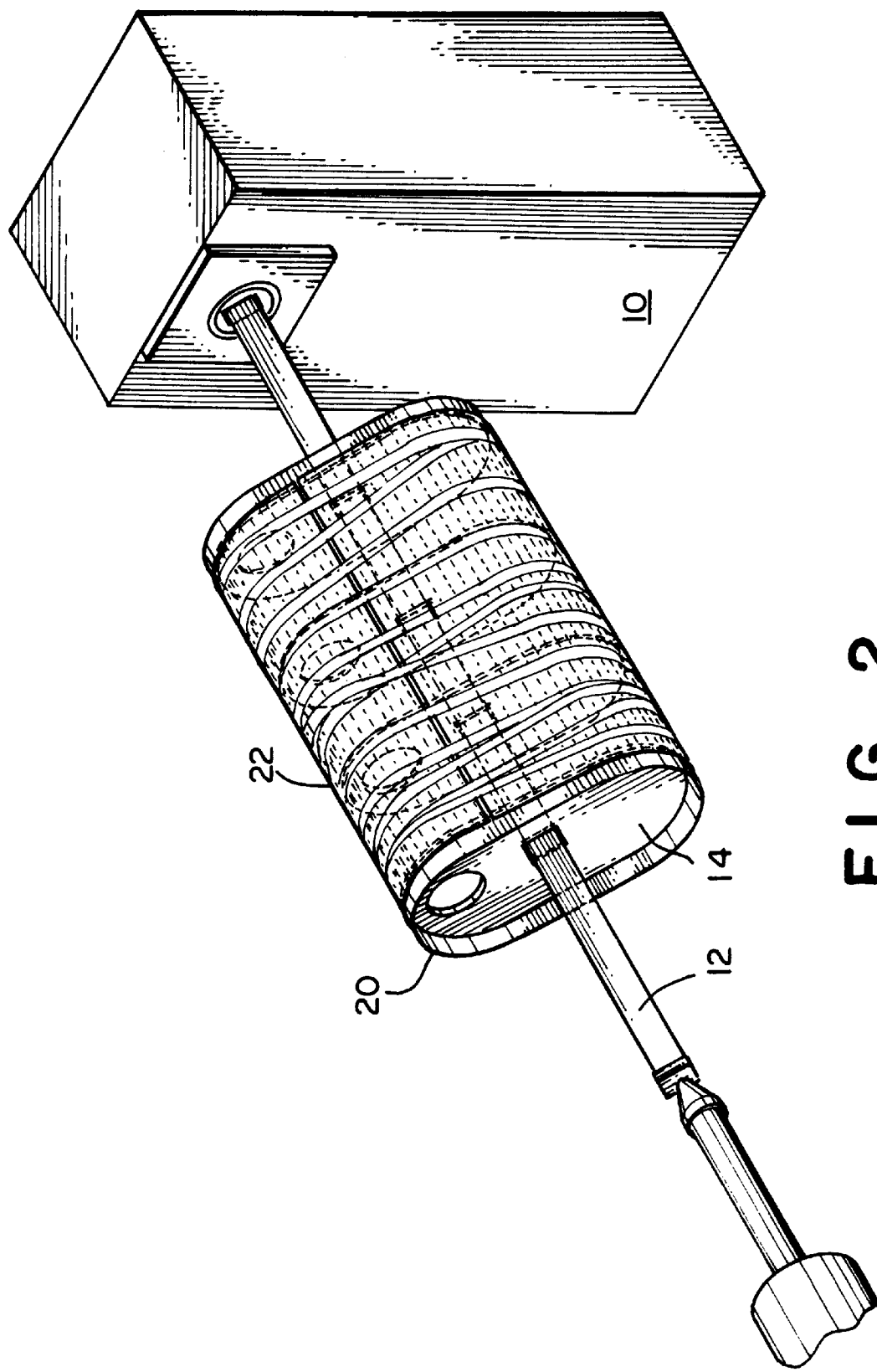
FIG. 2 is a perspective view showing the completion of the integrated winding form/mandrel/inner mold positioned in a winding machine.
Figure 5:
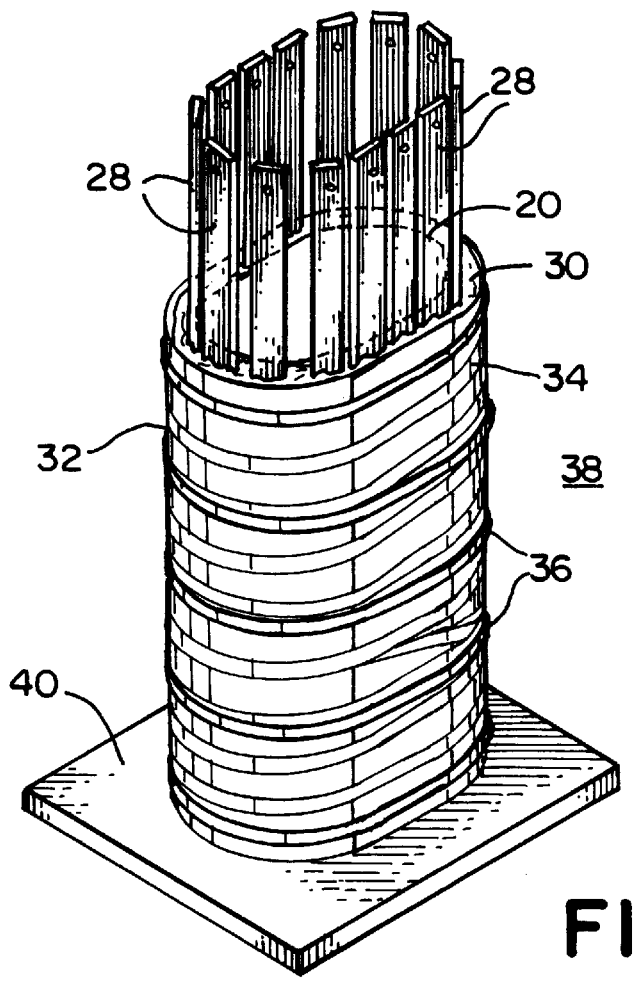
FIG. 5 is a perspective view of the manufactured coil and mold assembly of FIG. 4 removed from the winding machine and placed in upright position on a base ready for epoxy encapsulation.

After the coil 30 has been completed, it is wrapped with an outer layer of glass grid insulation similar to layer 22 in FIG. 2. The outer mold is then ready to be wrapped over the completed coil. The outer mold is constructed of the same steel sheet material as used in making the inner mold 20. Again the steel sheet is applied continuously with three overlapping layers, which are mechanically attached to the finished coil with glass adhesive tape to hold the sheet in its starting position. After wrapping the steel sheet over the finished coil 30, non-adhesive glass tape 32 is spirally wrapped over the outer mold 34 to secure it in position. The outer mold 34 is finally completed by banding the mold with banding strip 36 in five equally spaced positions as shown in FIG. 4. The manufactured coil and mold assembly 38 is then removed from the winding machine 10 and uprighted for mounting and attachment to a base plate 40 as shown in FIG. 5. A mechanical arrangement, not shown, preferably including a threaded tie rod is provided for forcing the coil and mold assembly 38 downwardly toward the base plate 40 to compress a silicone gasket, not shown, against the base plate 40 to prevent epoxy leaks during the encapsulation process. Once the final assembly is complete as shown in FIG. 5, the assembly is ready for epoxy encapsulation. The encapsulation process is a conventional vacuum encapsulation process used in manufacturing transformer coils.

Figure 6:
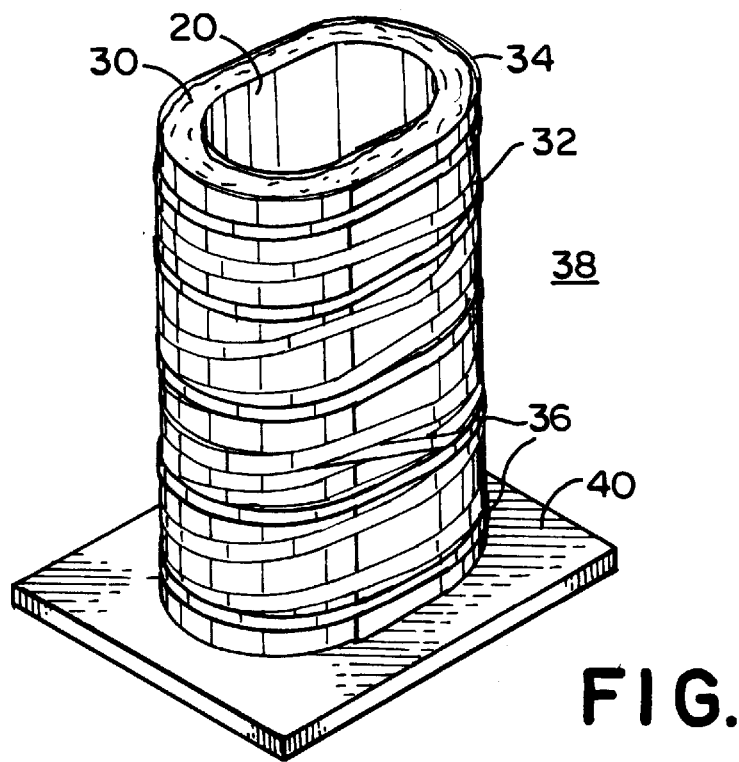
FIG. 6 is a perspective view illustrating the coil and mold assembly after encapsulation of the coil and removal of the cooling duct bars of FIG. 5.

After the mold and coil assembly 38 has been encapsulated, the cooling duct bars 28, FIG. 5, are removed as shown in FIG. 6. The cooling duct bars have previously been coated with silicone to aid in the removal from the encapsulated transformer coil. After removal of the cooling duct bars, the banding straps 36 holding the outer mold 34 are broken. The mechanical structure securing the mold and coil assembly 38 to the mounting plate 40 are removed and the outer mold shell 34 is then unwrapped from the encapsulated coil. The encapsulated coil 30 is removed from the molding base 40 and then the inner mold shell 20 is unwrapped from the interior of the coil.

From the foregoing it will been seen that the low voltage disposable mold concept with integrated winding mandrel has numerous beneficial features. Such features include winding on a disposable inner mold, disposable inner and outer mold shells, a wrap and band concept using lightweight sheet metal, winding and molding processes made on the winding machine, flexible overall coil configuration and winding process with integrated disposable winding mandrel, infinite increments in round to oval coil sizes, uniform and controlled epoxy thickness and lower cost flexible size mandrel and mold. One of the main advantages of the "wrap and band" concept is its low manufacturing costs and flexibility to make oval to round winding constructions. The costs are reduced in both the oval process and in the use of materials to fabricate any size disposable mandrel and mold shells. The process is simple in that lightweight and low cost sheet metal can be used to form both an integrated mandrel and mold shells during the winding process. Therefore, set up times and winding/mold fabrication are integrated into one process at the winding machine. An additional advantage results from the controlled and reduced epoxy thickness, which provides less epoxy used to encapsulate the low voltage coil and provides more reliable dialectric characteristics.

While a preferred embodiment of the present invention has been described and illustrated, it is to be understood that further modifications thereof can be made without departing from the scope of the appended claims.

What is claimed is:

1. A method of manufacturing a transformer coil encapsulated in casting resin utilizing a disposable casting mold comprising the steps of:

forming an annular mandrel by applying to a mandrel shaft, a plurality of annular shaped support plates spaced on the shaft, forming a disposable inner mold by wrapping sheet metal over the annular shaped support plates during the winding setup process, to produce an integrated winding form/mandrel/inner mold, for use in the winding process, placing the integrated winding form/mandrel/inner mold in a winding machine, winding a coil around the inner mold while in the winding machine, forming an outer mold by wrapping a plurality of sheet metal layers over the finished coil and mechanically attaching the layers to the finished coil to hold the sheet metal in its starting position, spirally wrapping non-adhesive glass tape over the outer mold to secure it in position and completing the outer mold by banding the outer mold with banding strip at a plurality of spaced positions, removing the manufactured coil and mold assembly from the winding machine, up righting the coil and mold assembly and attaching a base thereto, providing a seal between the base and the coil and mold assembly to prevent epoxy leaks during the encapsulation process, and filling the mold with epoxy to encapsulate the coil with casting resin.

2. A method of manufacturing a transformer coil encapsulated in casting resin according to claim 1 wherein the disposable inner mold is formed by three overlapping layers of sheet metal attached to the inner mold support plates so that the sheet metal can be tightly wrapped around the inner mold support plates thereby eliminating any metal slippage during the wrapping process, securing the wrapped sheet metal in place with non-adhesive tape temporarily, wrapping plastic tape over the entire length of the wrapped inner mold to provide sealing of the wrapped inner mold for the subsequent epoxy encapsulation process, and applying a mold release agent over the plastic tape to eliminate epoxy adhesion thereby simplifying the mold removal process thus completing the integrated winding form/mandrel/inner mold so that it is ready for the winding process.

3. A method of manufacturing a transformer winding encapsulated in casting resin according to claim 1 wherein the annular mandrel is oval shaped and is formed by applying a plurality of oval shaped support plates to the mandrel shaft and a disposable inner mold is formed in oval shape by wrapping sheet metal over the oval shaped support plates during the winding set up process to produce an integrated winding form/mandrel/inner mold for use in the winding process.

4. A method of manufacturing a transformer winding encapsulated in casting resin according to claim 1 wherein the annular mandrel is circular shaped and is formed by applying a plurality of circular shaped support plates to the mandrel shaft and a disposable circular inner mold is formed by wrapping sheet metal over the circular shaped support plates during the winding set up process to produce an integrated circular winding form/mandrel/inner mold for use in the winding process.

5. A method of manufacturing a transformer winding encapsulated in casting according to claim 1 wherein the outer mold is formed by wrapping a plurality of sheet metal layers over the finished coil and mechanically attaching the layers to the finished coil with adhesive tape to hold the sheet metal in its starting position.

6. A method of manufacturing a transformer winding encapsulated in casting resin according to claim 2 wherein the plastic tape wrapped over the entire length of the wrapped inner mold to provide sealing of the wrapped inner mold for the subsequent epoxy encapsulation process is a Mylar tape.

* * * * *